(12) United States Patent
Sakamaki et al.

(10) Patent No.: US 6,750,843 B2
(45) Date of Patent: Jun. 15, 2004

(54) DISPLAY DEVICE

(75) Inventors: Motohiko Sakamaki, Nakai-machi (JP); Yoshinori Machida, Nakai-machi (JP); Kiyoshi Shigehiro, Nakai-machi (JP); Yoshiro Yamaguchi, Nakai-machi (JP); Takeshi Matsunaga, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 153 days.

(21) Appl. No.: 09/935,746

(22) Filed: Aug. 24, 2001

(65) Prior Publication Data

US 2002/0027635 A1 Mar. 7, 2002

(30) Foreign Application Priority Data

Sep. 5, 2000 (JP) ........................................ 2000-268518

(51) Int. Cl.$^7$ ................................................ G09G 3/38
(52) U.S. Cl. .......................... 345/105; 345/85; 345/86; 345/107; 359/269
(58) Field of Search .......................... 345/105, 85, 86, 345/107; 359/269; 430/7; 349/108, 106

(56) References Cited

U.S. PATENT DOCUMENTS

| | | | | |
|---|---|---|---|---|
| 4,591,233 A | * | 5/1986 | Fergason | 349/86 |
| 4,732,456 A | * | 3/1988 | Fergason et al. | 349/95 |
| 4,832,458 A | * | 5/1989 | Fergason et al. | 349/56 |
| 4,876,165 A | * | 10/1989 | Brewer et al. | 430/7 |
| 5,076,668 A | * | 12/1991 | Dalisa et al. | 349/86 |
| 5,103,336 A | * | 4/1992 | Sieloff | 359/253 |
| 5,138,472 A | * | 8/1992 | Jones et al. | 349/166 |
| 5,654,811 A | * | 8/1997 | Spitzer et al. | 349/106 |
| 5,706,064 A | * | 1/1998 | Fukunaga et al. | 349/43 |
| 5,708,487 A | * | 1/1998 | Bergman | 349/63 |
| 6,310,674 B1 | * | 10/2001 | Suzuki et al. | 349/139 |
| 6,421,035 B1 | * | 7/2002 | Sheridon et al. | 345/85 |
| 6,549,327 B2 | * | 4/2003 | Foucher et al. | 359/296 |
| 2001/0046081 A1 | * | 11/2001 | Hayoshi et al. | |
| 2002/0018645 A1 | * | 2/2002 | Fouches et al. | |

FOREIGN PATENT DOCUMENTS

| | | | |
|---|---|---|---|
| JP | 359171931 A | * | 9/1984 |
| JP | 401142537 A | * | 6/1989 |

OTHER PUBLICATIONS

Jo et al., "New Toner Display Device (1) –Image Display Using Conductive Toner and Charge Transport Layer –", Japan Hardcopy, 1999, 249–252, 1999.

* cited by examiner

Primary Examiner—Long Pham
Assistant Examiner—Shrinivas H Rao
(74) Attorney, Agent, or Firm—Oliff & Berridge,PLC (57) ABSTRACT

Provided is a stable display device. The display device includes a pair of substrates that face each other, a spacer formed on one of the pair of substrates, a resin to fix one end of the spacer adjacent to the other substrate to the other substrate, and first and second particles of different colors and different electric characteristics all sealed in the inner space formed by the pair of substrates and the spacer.

11 Claims, 7 Drawing Sheets

BLACK DENSITY IN DRY ATOMOSHERE

FIG.10

WHITE DENSITY IN DRY ATOMOSHERE

DISPLAY DEVICE

BACKGROUND OF THE INVENTION

1. Field of the Invention

The present invention relates to a display device, more precisely to a display device that contains two types of particles inside it.

2. Description of the Related Art

Heretofore known is an electronic paper technology of using electronic energy to display desired images on display devices. The electronic paper technology is essentially based on electrophoresis, thermal rewritability, liquid crystal conversion and electrochromism, and this is broadly divided into two categories. One is to use a display device in which a liquid display element or a liquid containing solid display element particles dispersed therein is sealed between a pair of substrates; and the other is to use a display device in which electroconductive particles of different colors serving as a display element and insulating particles are sealed between a pair of substrates each having an electrode and a dielectric layer laminated in that order on a support. Of the two, the latter display device is driven by an electric field applied between the substrates, in which one of the electroconductive particles and the triboelectrically-charged particles move to one of the pair of substrates while the other particles move to the other substrate to thereby form an image owing to the color contrast between the two types of the particles. The image thus formed is still kept as it is even after the electric field applied between the substrates is turned off. By switching the electric field applied, the image formation in the device is repeated.

In the display device of the type that contains two types of particles, the particles are triboelectrically charged to form an image. In this, however, the chargeability of the particles and the adhesiveness thereof to the substrates vary, depending on the change of the ambient humidity. Therefore, the display device could not all the time produce stable images. In addition, the electrodes formed on the substrates are deteriorated by moisture.

SUMMARY OF THE INVENTION

The present invention has been made in view of the above circumstances, and provides a display device containing two types of particles and capable of producing stable images.

The display device provided by the invention includes a pair of substrates which face each other and at least one of which transmits light, a spacer sandwiched between the pair of substrates, and two types of particles of different colors and different electric characteristics all sealed in the inner space formed by the pair of substrates and the spacer, and the inner space in the display device is hermetically sealed up.

In a display device that contains two types of particles serving as a display element, the chargeability of the particles is influenced by the ambient humidity. Concretely, the particles are over-charged in a low-humidity atmosphere, but are charged insufficiently in a high-humidity atmosphere. In addition, when the humidity inside the space sandwiched between the substrates increases, the particle-to-particle cohesiveness and the particle-to-substrate adhesiveness increase, and, as a result, the particles could hardly move when an electric field is applied thereto.

In the display device of the invention, however, since the inner space formed by the pair of substrates and the spacer is hermetically sealed up, the electric characteristics of the particles sealed in the inner space are not influenced by the ambient humidity. Therefore, the display device all the time ensures constant image formation.

BRIEF DESCRIPTION OF THE DRAWINGS

Preferred embodiments of the invention will be described in detail based on the following figures, wherein.

DESCRIPTION OF THE PREFERRED EMBODIMENTS

The invention is described in detail hereinunder.

The display device of the invention includes a pair of substrates which face each other and at least one of which transmits light, a spacer sandwiched between the pair of substrates, and two types of particles of different colors and different electric characteristics all sealed in the inner space formed by the pair of substrates and the spacer.

The substrates may be composed of a support, an electrode and a dielectric film. The support may be made of glass or plastics, including, for example, polycarbonate resins, acrylic resins, polyimide resins and polyester resins. For the electrode, usable is any of indium, tin, cadmium or antimony oxides, composite oxides such as ITO, metals such as gold, silver, copper and nickel, and organic electroconductive materials such as polypyrrole and polythiophene. These may be in any form of single-layered films, mixed films or composite films, and may be formed in any method of vapor deposition, sputtering or coating. The thickness of the electrode film, when formed through vapor deposition or sputtering, may fall generally between 100 and 2000 angstroms. The electrode may be patterned in any desired manner, for example, to have a matrix pattern, in any known method of etching or the like for ordinary liquid crystal display devices or printed circuit boards. For the dielectric film, usable are polycarbonates, polyesters, polyimides, epoxy compounds, polyisocyanates, polyamides, polyvinyl alcohols, polybutadienes, polymethyl methacrylates, nylon copolymers, UV-curable acrylic resins, amorphous Teflons, etc. The dielectric film often has some influences on the chargeability and flowability of the particles in the device, and shall be suitably selected depending on the composition of the particles. One of the substrates must transmit light, for which, therefore, transparent materials of those mentioned above are preferred.

To enhance the adhesion of the dielectric film thereto, the substrates may be coated with an anchor-coating agent. The anchor-coating agent includes, for example, polyurethanes, polyamides, polyethyleneimines, amorphous polyesters, hydrophilic polyesters, ionic polymer complexes, and alkyl titanate resins. These may be used either singly or as combined. Their copolymers may also be used.

The spacer is made of an insulating material. Concretely, it may be made of any of thermoplastic resins, thermosetting resins, electron beam-curable resins, photo-curable resins and rubbers. Of these, preferred are electron beam-curable resins and photo-curable resins for a dry film resist that includes a photo-polymerizable layer, a support layer and optionally a protective layer. The dry film resist is processed to form a high-precision spacer of any desired height and shape. For developing the dry film resist, known is an alkali solution and a solvent, any of which is usable in the invention. The thickness of the film may fall generally between 50 and 300 μm.

The display device of the invention contains two types of particles that differ in color and in electric characteristics such as volume resistivity and charge polarity. For these, for example, usable is a combination of electroconductive particles and insulating particles, or a combination of plus-charging insulating particles and minus-charging insulating particles.

The electroconductive particles include carbon black; metal particles of nickel, silver, gold or tin; electroconductive metal oxide particles of ferrite, ITO, indium oxide, zinc oxide or antimony oxide-doped tin oxide; insulating particles coated with a metal or an electroconductive metal oxide; and thermoplastic or thermosetting resin particles containing any of carbon black, metals or electroconductive metal oxides.

The insulating particles include glass beads; insulating metal oxide particles of alumina or titanium oxide; thermoplastic or thermosetting resin particles; thermoplastic or thermosetting resin particles having a colorant fixed on their surfaces; and thermoplastic or thermosetting resin particles containing an insulating colorant therein.

Examples of the thermoplastic resins to be used for forming the particles are homopolymers and copolymers of styrenes such as styrene and chlorostyrene; monoolefins such as ethylene, propylene, butylene and isoprene; vinyl esters such as vinyl acetate, vinyl propionate, vinyl benzoate and vinyl butyrate; α-methylene-aliphatic monocarboxylates such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers such as vinyl methyl ether, vinyl ethyl ether and vinyl butyl ether; and vinyl ketones such as vinyl methyl ketone, vinyl hexyl ketone and vinyl isopropenyl ketone. The thermosetting resins to be used for forming the particles include crosslinked resins such as crosslinked copolymers of essentially divinylbenzene, and crosslinked polymethyl methacrylates; and phenolic resins, urea resins, melamine resins, polyester resins, and silicone resins. Typical examples of binder resins are polystyrenes, styrene-alkyl acrylate copolymers, styrene-alkyl methacrylate copolymers, styrene-acrylonitrile copolymers, styrene-butadiene copolymers, styrene-maleic anhydride copolymers, polyethylenes, polypropylenes, polyesters, polyurethanes, epoxy resins, silicone resins, polyamides, modified rosins, and paraffin waxes.

For the colorant, usable are organic or inorganic pigments and oil-soluble dyes. Any known colorant is usable herein, including, for example, magnetic powders of magnetite or ferrite; and carbon black, titanium oxide, magnesium oxide, zinc oxide, copper phthalocyanine-type cyan colorants, azo-type yellow colorants, azo-type magenta colorants, and quinacridone-type magenta colorants, red pigments, green pigments and blue pigments. Concretely, typical examples of the colorants are aniline blue, chalcoyl blue, chrome yellow, ultramarine blue, DuPont oil red, quinoline yellow, methylene blue chloride, phthalocyanine blue, malachite green oxalate, lamp black, rose bengal, C.I. Pigment Red 48:1, C.I. Pigment Red 122, C.I. Pigment Red 57:1, C.I. Pigment Yellow 97, C.I. Pigment Blue 15:1, and C.I. Pigment Blue 15:3. Air-containing, porous spongy particles and hollow particles are usable for white particles. The two types of particles are so selected that they differ in color.

The shape of the particles is not specifically defined. In case where the particles are spherical, the particle-to-particle contact is almost in a mode of point contact; and the contact of the particles to the inner surface of the substrate is also almost in a mode of point contact. Therefore, the particle-to-particle cohesion and the adhesion of the particles to the inner surface of the substrate based on the van der Waals force therebetween is small. Accordingly, even when a dielectric film is on the inner surface of the substrate, the particles charged in an electric field can smoothly move the space between the substrates. The spherical particles can be formed in suspension polymerization, emulsion polymerization or dispersion polymerization.

The primary particles generally have a particle size of from 1 to 1000 μm, preferably from 5 to 50 μm, but are not limited to the size range. For obtaining high-contrast images, it is desirable that the two types of the particles all have nearly the same particle size. This evades the trouble that large particles are surrounded by small particles to lower the color density intrinsic to large particles.

If desired, the insulating particles may be coated with an external additive adhering to their surfaces. Preferably, the external additive is white or transparent so as not to have any influences on the color of the particles.

For the external additive, usable are fine inorganic particles of metal oxides such as silicon oxide (silica), titanium oxide and alumina. To control their chargeability, flowability and environment dependency, the fine particles may be surface-treated with a coupling agent or silicone oil.

Coupling agents are charged positively or negatively. The positive-charging coupling agents include aminosilane-type coupling agents, aminotitanium-type coupling agents, and nitrile-type coupling agents; and the negative-charging coupling agents include nitrogen-free, silane-type coupling agents, titanium-type coupling agents, epoxysilane coupling agents and acrylsilane coupling agents (that is, these are composed of atoms except nitrogen). Similarly, silicone oils are charged positively or negatively. The positive-charging silicone oils include amino-modified silicone oils; and the negative-charging silicone oils include dimethylsilicone oils, alkyl-modified silicone oils, α-methylsulfone-modified silicone oils, methylphenyl-silicone oils, chlorophenyl-silicone oils, and fluorine-modified silicone oils. These are selected for use herein, depending on the intended resistance of the external additive.

Of the external additives, preferred are well-known hydrophobic silica and hydrophobic titanium oxide. Especially preferred are titanium compounds obtained through reaction of $TiO(OH)_2$ and a silane compound such as a silane-coupling agent. The compounds are described in Japanese Patent Laid-Open No. 3177/1998. The silane compound may be any of chlorosilanes, alkoxysilanes, silazanes, and special silylating agents. The titanium compounds may be produced by reacting $TiO(OH)_2$ prepared in a wet process with such a silane compound or a silicone oil, followed by drying the resulting product. Since the process of producing the titanium compounds does not include a step of baking the products at temperatures on the level of hundreds degrees, Ti-to-Ti strong bonds are not formed in the products, and the particles of the products do not aggregate at all. Accordingly, the particles are almost in the form of primary particles. In addition, since $TiO(OH)_2$ is directly reacted with a silane compound or a silicone oil, the amount of the silane compound or the silicone oil to be reacted can be increased. Therefore, the chargeability of the products can be well controlled by controlling the amount of the silane compound or the silicone oil to be reacted with $TiO(OH)_2$. In addition, the chargeability of the products is significantly improved over that of conventional titanium oxide.

The particle size of the primary particles of the external additive generally falls between 5 and 100 nm, preferably between 10 and 50 nm, but is not limited to the range.

The ratio of the external additive to the particles may be suitably determined, depending on the particle size of the particles and on the particle size of the external additive particles. If the amount of the external additive is too large, the external additive will be partly released from the surfaces of the particles, and it will adhere to the surfaces of other particles. If so, the particles could not have the intended charging characteristics. In general, the amount of the external additive may fall between 0.01 and 3 parts by weight, preferably between 0.05 and 1 part by weight, relative to 100 parts by weight or the particles.

In case where two types of insulating particles are used, the composition of the particles to be combined, the blend ratio of the particles, the presence or absence of an external additive, and the composition of the external additive are so determined that the particles combined can have the intended charging characteristics.

The image contrast depends on the particle size of the two types of particles in the display device and on the blend ratio of the particles. For obtaining high-contract images, the blend ratio of the particles is preferably so determined that the two types of the particles blended have nearly the same surface area. If the blend ratio oversteps it to a great extent, the color of the particles of which the amount is much larger than that of the other particles will be highlighted in the images displayed. However, this shall not apply to the case where the two types of the particles give a similar color tone and one of them are desired to give a deep color tone while the other to give a light color tone, and to the case where the color to be produced by the mixture of the two types of the particles is utilized in image formation.

In the display device of the invention, the two types of particles are sealed in the space formed by a pair of substrates and a spacer, and the space is hermetically sealed up. For sealing up the space, for example, employed is a method of forming a spacer on one of a pair of substrates, and fixing it to the other substrate with a resin; a method of filling a resin into the space formed by the outer surface of a spacer and a pair of substrates; a method of forcedly inserting an elastic member into the space formed by the outer surface of a spacer and a pair of substrates; or a method of forming a spacer on one of a pair of substrates, and putting an elastic member between one end of the spacer adjacent to the other substrate and the other substrate.

For forming the spacer on the substrate, for example, employed is a method of thermally laminating a dry resist film on the electrode formed on the support of the substrate, by the use of a hot laminator or the like, putting a mask pattern on the dry resist film, then exposing the resist film to light via the mask pattern, removing the support layer from the resist film, and finally developing the thus-exposed resist film with a developer. The operation of this method may be repeated until the spacer formed has a desired thickness. After the spacer has been formed, a dielectric film is formed on the electrode in the area not coated with the spacer.

The resin to be used for sealing up the space is preferably a moisture-proof resin. Concretely, it includes thermoplastic resins, thermosetting resins, electron beam-curable resins (e.g., UV-curable resins), and photo-curable resins. These may be used either singly or as combined. Two or more resins of the same type (for example, two or more thermoplastic resins) may be combined for use herein.

Thermoplastic resins include polyolefins such as polypropylenes, polyethylenes and ethylene-propylene copolymers; polyesters, polyamides, ionomers; vinyl resins such as polyvinyl acetates and ethylene-vinyl acetate copolymers; acrylic resins of acrylates or methacrylates; polyvinyl acetals, phenolic resins, modified epoxy resins, amorphous polyesters; and their copolymers and mixtures. Of those, preferred are polymers and their mixtures containing at least 60 mol % of at least one of acrylonitrile components, vinyl alcohol components, vinyl butyral components, cellulose components, aramid components and vinylidene halide components.

Polymers from a monomer of acrylonitrile include polyacrylonitriles and acrylonitrile-butadiene copolymers. Polymers from a monomer of vinyl alcohol include polyvinyl alcohols. Polymers from a monomer of vinyl butyral include polyvinyl butyrals. Polyvinyl butyrals may be combined with epoxy resins for use herein. Polymers from a monomer of vinylidene halide include PVDC (polyvinylidene chlorides), PVDC-VC (vinyl chloride) copolymers, PVDC-acrylonitrile copolymers, PVDC-acrylate copolymers, ter-copolymers of vinylidene chloride with some other monomers copolymerizable with it, and PTFE.

Thermosetting resins include epoxy resins; guanamine resins; polyester resins such as diallyl phthalate resins, vinyl ester resins, maleic acid resins and unsaturated polyester resins; polyurethanes; polyimides; melamine resins; urea resins; acrylic resins; silicone resins; alkyd resins; phenolic resins; xylene resins; phenoxyether-type crosslinked resins; and their copolymers and mixtures.

For electron beam-curable resins for use herein, preferred are epoxy resins such as epoxy-acrylates; urethane acrylates, polyester acrylates, polyfunctional acrylates, polyether acrylates, silicone acrylates, polybutadiene acrylates, unsaturated polyester/styrenes, polyene/thiols, polystyryl methacrylates, UV-curable lacquers; and their oligomers, copolymers and mixtures.

Photocurable resins include epoxy resins, silicone resins, and acrylic resins.

Of electron beam-curable resins and photocurable resins, preferred are epoxy resins. The epoxy resins may be mono-component type resins capable of curing alone, or two-component type resins that cure when two components are mixed. For the two-component type resins, two adhesive components are mixed and must be degassed in a vacuum of at most $5.33 \times 10^3$ Pa (400 mmHg) for 15 to 30 minutes to remove bubbles from the mixture.

The resin may be applied onto the spacer or between the spacer and the substrate, in a mode of screen printing or by the use of a dispenser.

In the invention, the resin to be applied to the spacer or to be used for hermetically sealing up the space may contain any of a polymerization initiator, a chain transfer agent, a photo-sensitizer, a dye, and a crosslinking agent.

The elastic member to be used in the invention is a sealing member such as O-rings. Its material includes, for example, butyl rubber, nitrile rubber, chloroprene rubber, neoprene rubber, ethylene-propylene copolymer rubber, urethane rubber, silicone rubber, and fluororubber (Viton), but is not limited to these.

In case where the elastic member is used, a fixing unit for fixing the pair of substrates is used along with it. The fixing unit includes, for example, a combination of bolt and nut, clamps, clips, and frames for fixing substrates.

FIG. 1 through FIG. 8 show display devices of first to fourth embodiments of the invention. As in FIG. 1, the display device 10 of the first embodiment includes a pair of substrates 12, 14 disposed opposite to each other; a spacer 16 formed on the substrate 14; a resin 22 to fix one end of the spacer 16 adjacent to the substrate 12 to the substrate 12; and first and second particles 18, 20 of different colors and different electric characteristics which are sealed in the inner space surrounded by the substrates 12, 14 and the spacer 16. The substrate 12 is composed of a transparent support 12A, a transparent electrode 12B formed thereon, and a dielectric film 12C formed on the transparent electrode 12B; and this transmits light. The substrate 14 is composed of a support 14A, an electrode 14B formed thereon, and a dielectric film 14C formed on the electrode 14B. The transparent electrode 12B and the electrode 14B are connected to a power supply 24; and the electrode 14B is grounded.

Figure 1:
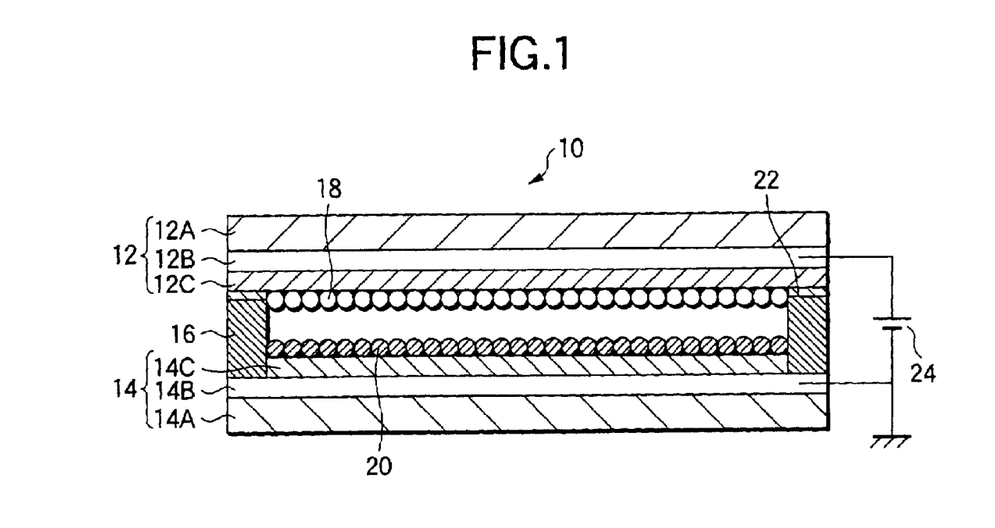
FIG. 1 is a cross-sectional view of one embodiment of the display device of the invention.

The spacer 16 is formed along the periphery of the substrate 14. As in FIG. 2, the resin 22 entirely covers the surface of the spacer 16 adjacent to the substrate 12, and therefore the inner space formed by the substrates 12, 14 and the spacer 16 is hermetically sealed up.

Figure 2:
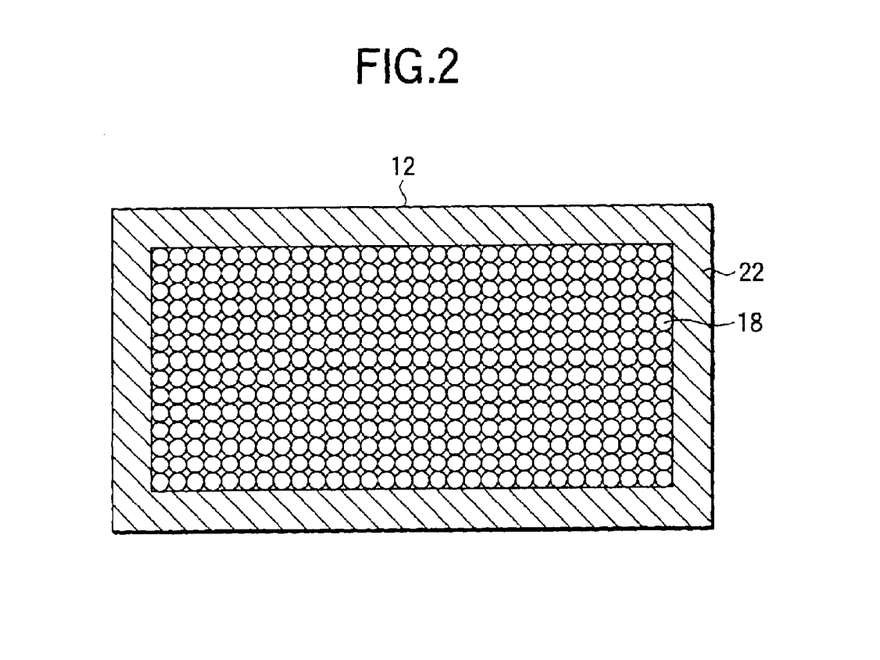
FIG. 2 is a plan view of the display device of FIG. 1.

The display device 10 is fabricated as follows: The substrate 12 is prepared. An electrode 14B is formed on the support 14A; and a spacer 16 is formed on the electrode 14B. For the spacer 16, used is a dry film. With that, a dielectric film 14C is formed on the electrode 14B in the region in which the spacer 16 is not formed. First and second particles 18, 20 are put into the space formed by the spacer 16 and the substrate 14. A resin 22 is applied onto the top surface of the spacer 16, and then the substrate 12 is put on the spacer 16. In that condition, the resin 22 is solidified or cured to finish the display device 10.

Figure 3:
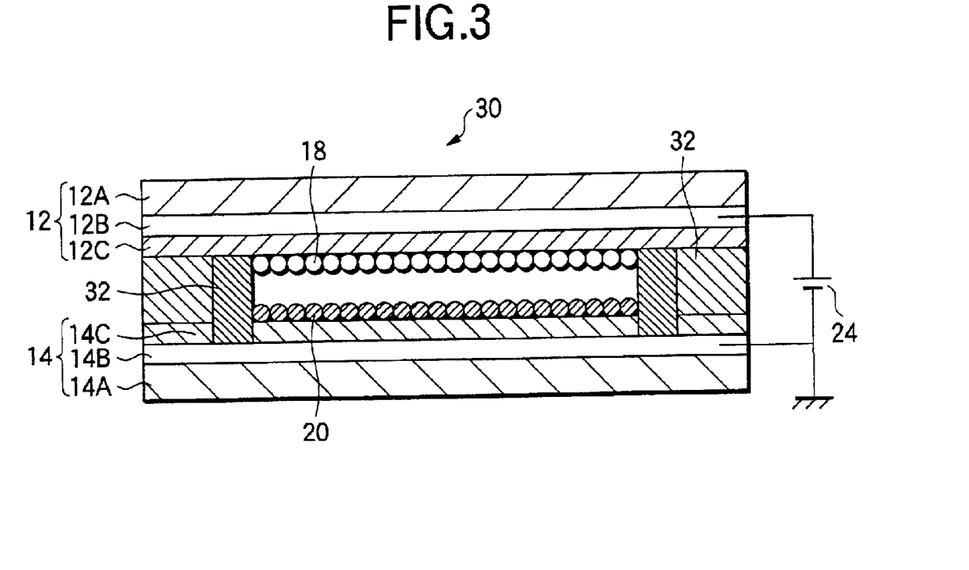
FIG. 3 is a cross-sectional view of another embodiment of the display device of the invention.
Figure 4:
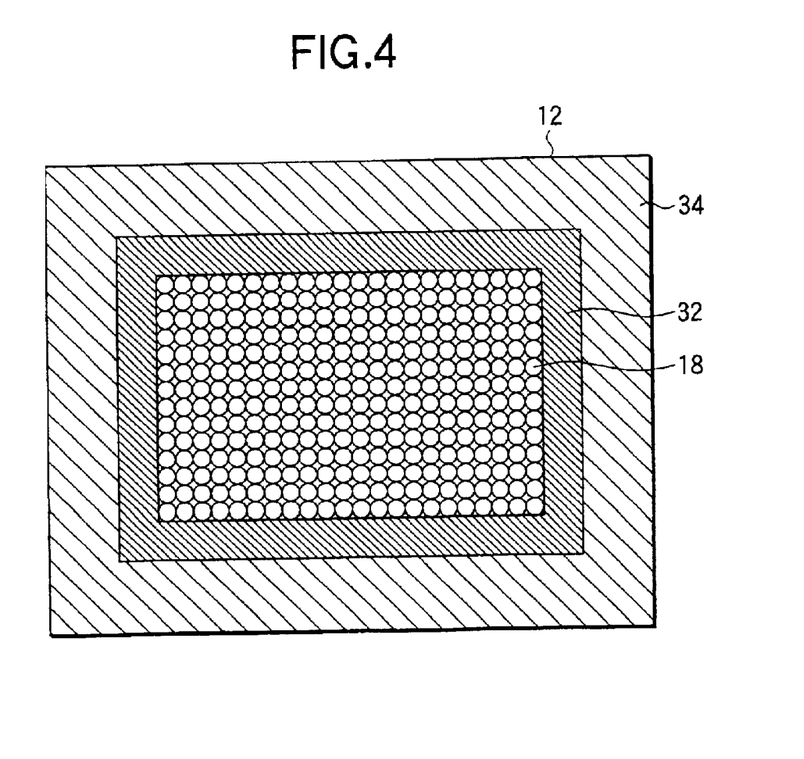
FIG. 4 is a plan view of the display device of FIG. 3.

FIG. 3 and FIG. 4 show a display device 30 of the second embodiment. In this, the same constitution as in the display device 10 of the first embodiment is designated by the same numeral reference, and describing it is omitted herein. The display device 30 includes a spacer 32 disposed inside the periphery of the substrate 14, in which the spacer 32 is analogous to the substrate 14 and has a hollow area inside it. In addition, the display device 30 includes a resin 34 filled in the space surrounded by the substrates 12, 14 and the outer surface of the spacer 32.

The display device 30 is fabricated as follows: The substrate 12 is prepared. An electrode 14B is formed on the support 14A; and a spacer 32 is formed on the electrode 14B. For the spacer 32, used is a dry film. With that, a dielectric film 14C is formed on the electrode 14B in the region in which the spacer 32 is not formed. First and second particles 18, 20 are put into the space formed by the spacer 32 and the substrate 14. The substrate 12 is put on the spacer 32, and these are clamped or clipped together. Next, a resin 34 is filled into the space formed by the outer surface of the spacer 32 and the substrates 12, 14, and then solidified or cured therein to finish the display device 30.

Figure 5:
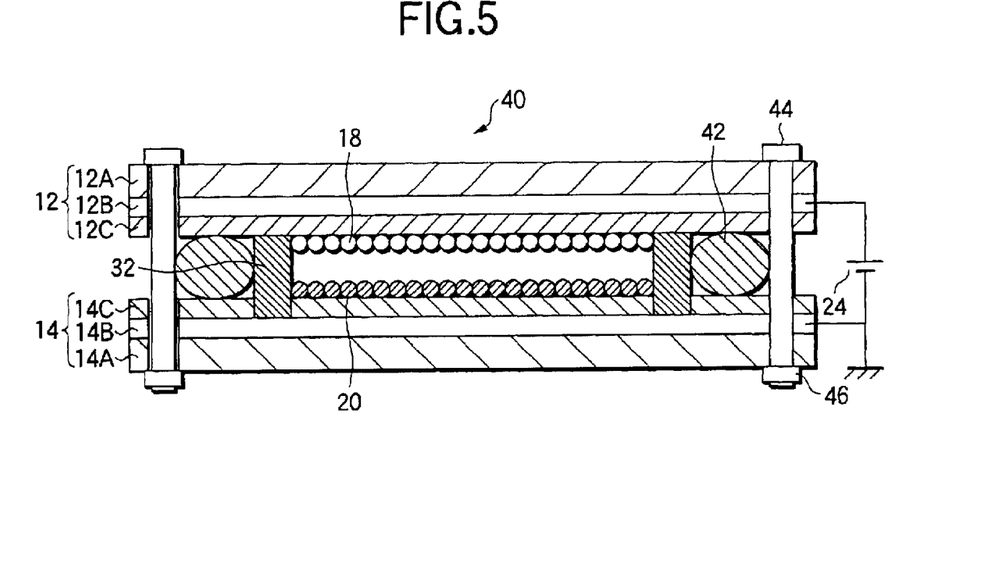
FIG. 5 is a cross-sectional view of still another embodiment of the display device of the invention.
Figure 6:
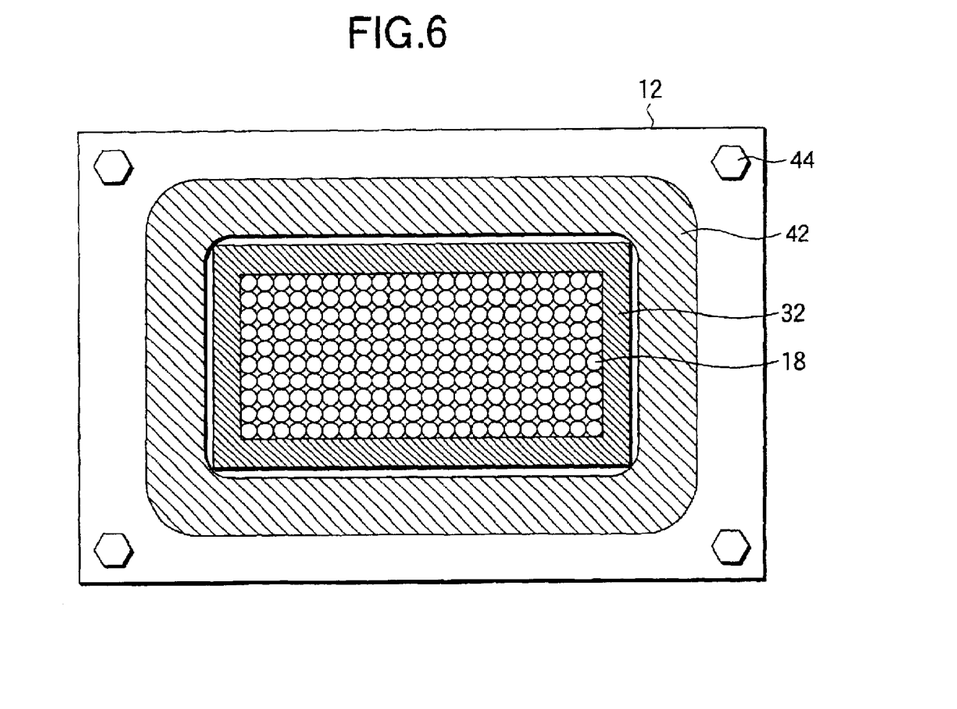
FIG. 6 is a plan view of the display device of FIG. 5.

FIG. 5 and FIG. 6 show a display device 40 of the third embodiment. In this, the same constitution as in the display device 10 of the first embodiment and in the display device 30 of the second embodiment is designated by the same numeral reference, and describing it is omitted herein. In the display device 40, a ring-like elastic member 42 is pushed into the space formed by the outer surface of the spacer 32 and the substrates 12, 14; and the substrates 12, 14 are fixed by bolts 44 and nuts 46, pressing the ring-like elastic member 42 against them.

The display device 40 is fabricated as follows: The substrate 12 is prepared. An electrode 14B is formed on the support 14A; and a spacer 32 is formed on the electrode 14B. For the spacer 32, used is a dry film. With that, a dielectric film 14C is formed on the electrode 14B in the region in which the spacer 32 is not formed. First and second particles 18, 20 are put into the space formed by the spacer 32 and the substrate 14. A ring-like elastic member 42 is disposed around the spacer 32, and the substrate 12 is put on the spacer 32. In that condition, the corners of the substrates 12, 14 are fixed by bolts 44 and nuts 46 to finish the display device 40. In the display device 40, the ring-like elastic member 42 is pressed against the substrates 12, 14 that are fixed by the bolts 44 and the nuts 46, and is therefore deformed to hermetically seal up the inner space surrounded by the substrates 12, 14 and the spacer 32.

Figure 7:
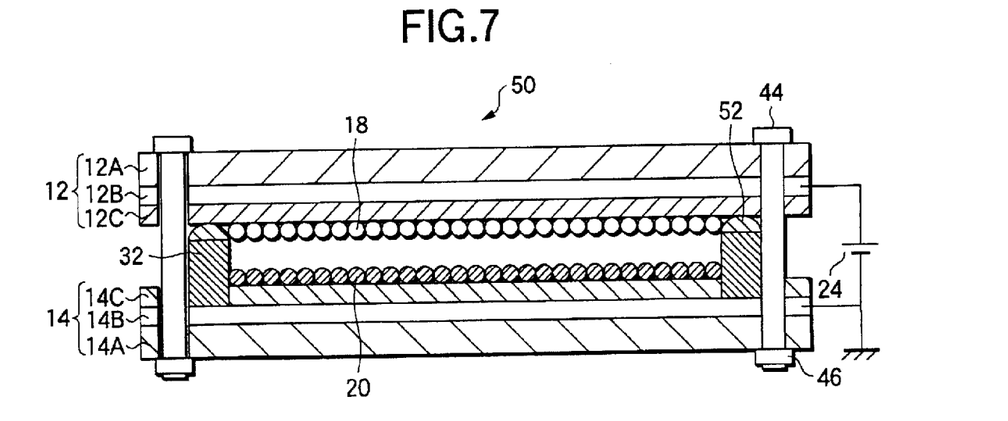
FIG. 7 is a cross-sectional view of still another embodiment of the display device of the invention.
Figure 8:
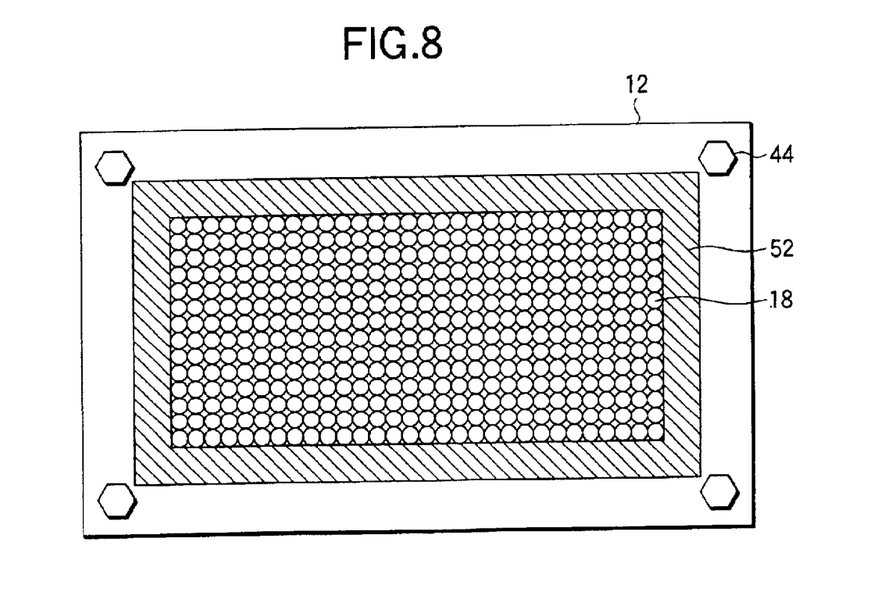
FIG. 8 is a plan view of the display device of FIG. 7.

FIG. 7 and FIG. 8 show a display device 50 of the fourth embodiment. In this, the same constitution as in the display device 10 of the first embodiment, in the display device 30 of the second embodiment and in the display device 40 of the third embodiment is designated by the same numeral reference, and describing it is omitted herein. In the display device 50, a ring-like elastic member 52 is sandwiched between one end of the spacer 32 adjacent to the substrate 12 and the substrate 12; and the substrates 12, 14 are fixed by bolts 44 and nuts 46, pressing the ring-like elastic member 52 against the substrate 12 and the spacer 32.

The display device 50 is fabricated as follows: The substrate 12 is prepared. An electrode 14B is formed on the support 14A; and a spacer 32 is formed on the electrode 14B. For the spacer 32, used is a dry film. With that, a dielectric film 14C is formed on the electrode 14B in the region in which the spacer 32 is not formed. First and second particles 18, 20 are put into the space formed by the spacer 32 and the substrate 14. A ring-like elastic member 52 is disposed on the spacer 32, and the substrate 12 is put on the ring-like elastic member 52. In that condition, the corners of the substrates 12, 14 are fixed by bolts 44 and nuts 46 to finish the display device 50. In the display device 50, the ring-like elastic member 52 is pressed against the substrate 12 and the spacer 32, and is therefore deformed to hermetically seal up the inner space surrounded by the substrates 12, 14 and the spacer 32.

The display devices illustrated hereinabove are used, for example, for data-storable and rewritable bulletin boards, notices for circulation, electronic blackboards, advertisement boards, signboards, blinking signs, electronic papers, electronic newspapers, and documents sheets capable of being combined with duplicators and printers.

EXAMPLES

Examples of the invention are described below. In these, parts are by weight, unless otherwise specifically indicated.

Example 1

Ilmenite is dissolved in sulfuric acid, and iron is removed from it. Water is added to the resulting $TiOSO_4$ to hydrolyze it into $TiO(OH)_2$. Next, 50 parts of isopropyltrimethoxysilane is dropwise added to 100 parts of $TiO(OH)_2$ prepared in the manner as above and dispersed in 500 $cm^3$ of water, with stirring it at room temperature. Next, the fine particles in the resulting mixture are taken out through filtration, and washed with water. The washing operation is repeated. The resulting titanium compound, surface-treated with isopropyltrimethoxysilane, is dried at 150° C., and then ground for 2 minutes in a sample mill to obtain an external additive having a mean particle size of 30 nm.

0.4 parts by weight of the external additive is added to 100 parts by weight of particles, which are obtained by classifying spherical particles of titanium oxide-containing crosslinked polymethyl methacrylate (Sekisui Plastics' Techpolymer MBX-20-White) and have a volume-average particle size of 20 $\mu$m, and these are stirred to prepare first particles.

Spherical particles of carbon-containing crosslinked polymethyl methacrylate (Sekisui Plastics' Techpolymer MBX-20-Black) are classified to prepare second particles having a volume-average particle size of 20 $\mu$m.

ITO is sputtered onto a rectangular transparent glass support having a thickness of 2 mm to form an electrode thereon. A solution of 5 parts by weight of a polycarbonate resin (Mitsubishi Gas Chemical's PC-Z) dissolved in 45 parts by weights of monochlorobenzene is applied onto the electrode in a mode of dip-coating, and dried to form thereon a dielectric film having a thickness of 5 $\mu$m. Thus is prepared a first substrate.

On the other hand, a copper electrode is laminated on one surface of a rectangular epoxy support having a thickness of 5 mm. On the electrode, thermally laminated is a dry resist film (Hitachi Chemical's Fotec H-9050; photosensitive layer of 50 $\mu$m thick) by the use of a hot laminator having a roll temperature of 110° C. A rectangular mask having a rectangular hollow space in the center and having the same size as that of the support is put on the dry resist film, which is then exposed to an ultra-high-pressure mercury lamp. The radiation energy for exposure is 100 $mJ/cm^2$. Next, the support layer of the dry resist film is peeled of, and the film is developed with a solution of sodium hydroxide to remove the non-exposed part of the film. This operation is repeated 6 times to form a uniform spacer having a height of 300 $\mu$m and a width of 200 $\mu$m. Next, a solution of 5 parts by weight of a polycarbonate resin (Mitsubishi Gas Chemical's PC-Z) dissolved in 45 parts by weight of monochlorobenzene is applied onto the copper electrode in the region not coated with the spacer, in a mode of dip-coating, and then dried to form thereon a dielectric film having a thickness of 5 $\mu$m. Thus is prepared a second substrate.

The first particles and the second particles are mixed in a ratio of 2/1 by weight, and the resulting, mixed particles are sieved down into the hollow area of the spacer through a sieving screen. The amount of the mixed particles thus put into the hollow area is 6.7 $g/cm^2$. The particles having adhered onto the upper surface of the spacer are wiped away by the use of a silicone rubber blade.

Next, the two components of a two-component epoxy resin (Ciba-Geigy's Araldite) are mixed, and degassed under $5.33 \times 10^3$ Pa for 5 minutes, and the resulting mixture is applied onto the spacer. With that, the first substrate is put on the spacer in such a manner that its dielectric layer faces the spacer, and the mixture is cured to finish a display device.

Example 2

A first substrate, a second substrate, a spacer and mixed particles are formed in the same manner as in Example 1. In this, however, a rectangular mask having a rectangular hollow space in the center and having a smaller size than the second substrate is used. The mixed particles are sieved down into the hollow area of the spacer through a sieving screen. The amount of the mixed particles thus put into the hollow area is 6.7 $g/cm^2$. The particles having adhered onto the upper surface of the spacer are wiped away by the use of a silicone rubber blade.

Next, the first substrate is put on the spacer in such a manner that its dielectric layer faces the spacer, and the first and second substrates are fixed by clamping them. Next, the two components of a two-component epoxy resin (Ciba-Geigy's Araldite) are mixed, and degassed under $5.33 \times 10^3$ Pa for 5 minutes. The resulting mixture is put into the space formed by the outer surface of the spacer and the first and second substrates, by the use of a dispenser, and cured therein to finish a display device.

Example 3

A first substrate, a second substrate and a spacer are formed in the same manner as in Example 2. The same mixed particles as those used in Example 1 are sieved down into the hollow area of the spacer through a sieving screen. The amount of the mixed particles thus put into the hollow area is 6.7 $mg/cm^2$. The particles having adhered onto the upper surface of the spacer are wiped away by the use of a silicone rubber blade.

Next, an O-ring of Viton rubber is disposed to surround the spacer, and the first substrate is put on the spacer in such a manner that its dielectric layer faces the spacer. With that, the corners of the first and second substrates are fixed by bolts and nuts to finish a display device.

Example 4

A first substrate, a second substrate and a spacer are formed in the same manner as in Example 2. The same mixed particles as those used in Example 1 are sieved down into the hollow area of the spacer through a sieving screen. The amount of the mixed particles thus put into the hollow area is 6.7 $mg/cm^2$. The particles having adhered onto the upper surface of the spacer are wiped away by the use of a silicone rubber blade.

Next, an O-ring of Viton rubber is disposed on the spacer, and the first substrate is put on the O-ring in such a manner that its dielectric layer faces the O-ring. With that, the corners of the first and second substrates are fixed by bolts and nuts to finish a display device.

Comparative Example 1

A display device is fabricated in the same manner as in Example 1. In this, however, the first substrate and the spacer are not sealed with a resin, and the first and second substrates are fixed by clamping them.

Evaluation

Six display devices are prepared in each of Examples and Comparative Examples, and these are divided into three groups of two each. The electrode of each display device is connected with a driving unit. With that, each display device is initialized by applying a voltage thereto. The mean charge of the first and second particles measured through charge spectrometry is −16 fC and +16 fC, respectively. For one display device of each group, a voltage is applied to the electrode to blacken the entire surface of the first substrate; and for the other display device of each group, a voltage is applied to the electrode to whiten the entire surface of the first substrate. Even after applying the voltage thereto is stopped, the entire surface of the first substrate of each display device is still black or white. In that condition, the optical density of the image seen on the first substrate of each display device is measured with a densitometer (X-Rite's X-Rite 404A). Next, the display devices of the first group are left in a dry atmosphere (25° C., 30% RH), those of the second group are in an ordinary atmosphere (25° C., 50% RH), and those of the third group are in a wet atmosphere (25° C., 80% RH), all for one week. After having been thus left in different atmospheres, one display device of each group is charged to show a black image and the other is to show a white image, and the optical density of the image thus shown in each display device is measured, in the same manner as above. The cycle of leaving the display devices in different atmospheres for one week, followed by driving them and measuring the optical density of the images shown therein is repeated for a total of 7 weeks. The data are shown in FIG. 9 through FIG. 14.

Figure 9:
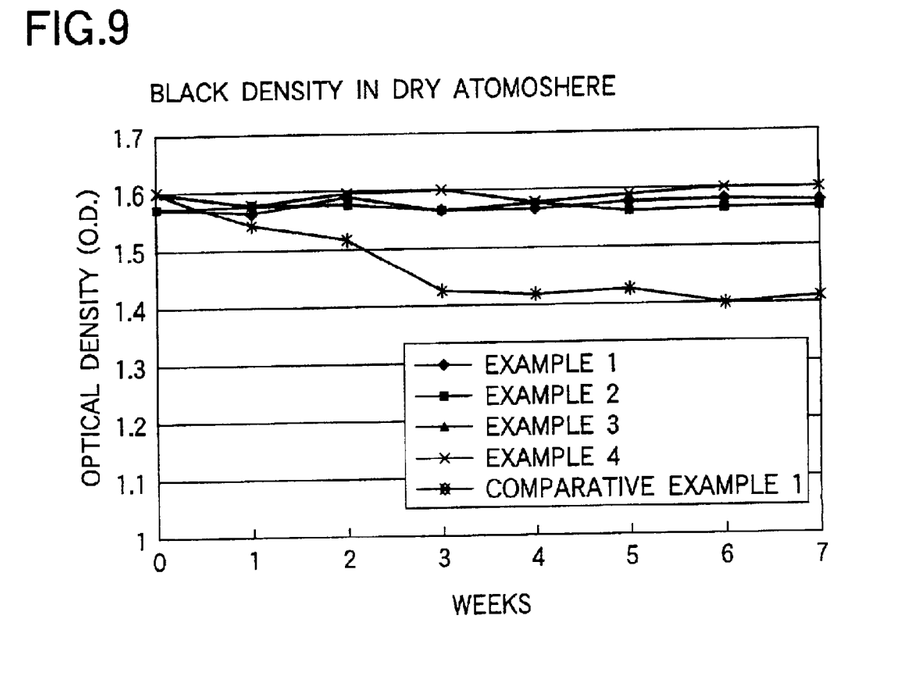
FIG. 9 is a graph showing the relationship between the optical density of black images in display devices left in a dry atmosphere and the time for which the display devices are left in the atmosphere.
Figure 10:
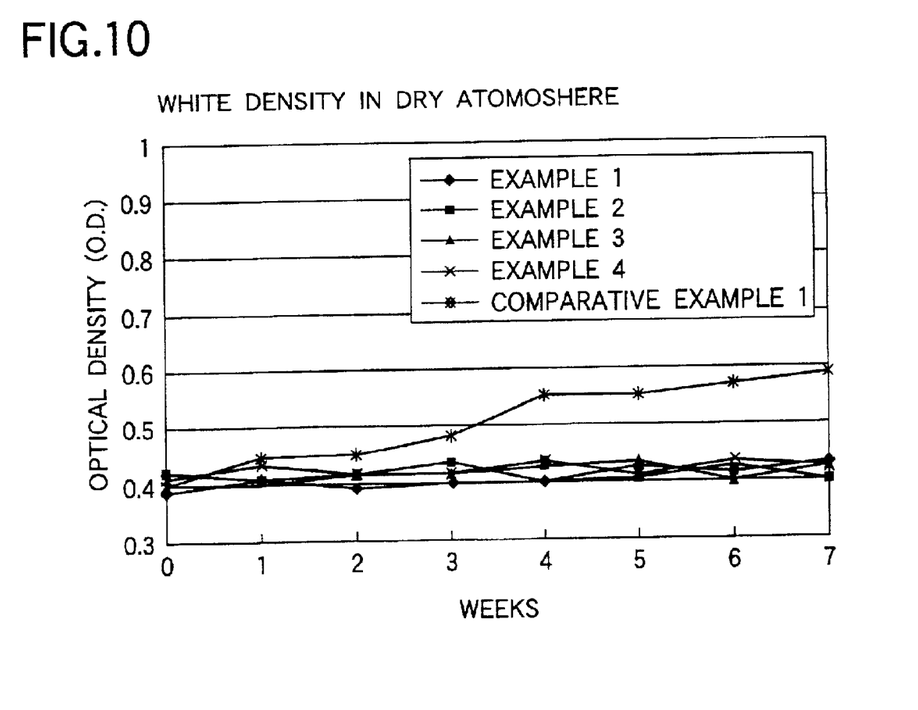
FIG. 10 is a graph showing the relationship between the optical density of white images in display devices left in a dry atmosphere and the time for which the display devices are left in the atmosphere.

From FIG. 9 and FIG. 10, it is understood that the display devices of Examples 1 to 4 are all stable in the dry atmosphere, though their performance fluctuates in some degree. On the other hand, however, the optical density of the black image shown in the display device of Comparative Example 1 gradually decreases with the lapse of time, while that of the white image shown therein gradually increases. This means that the image contrast of the display device of Comparative Example 1 is influenced by the ambient atmosphere and is thereby lowered.

Figure 11:
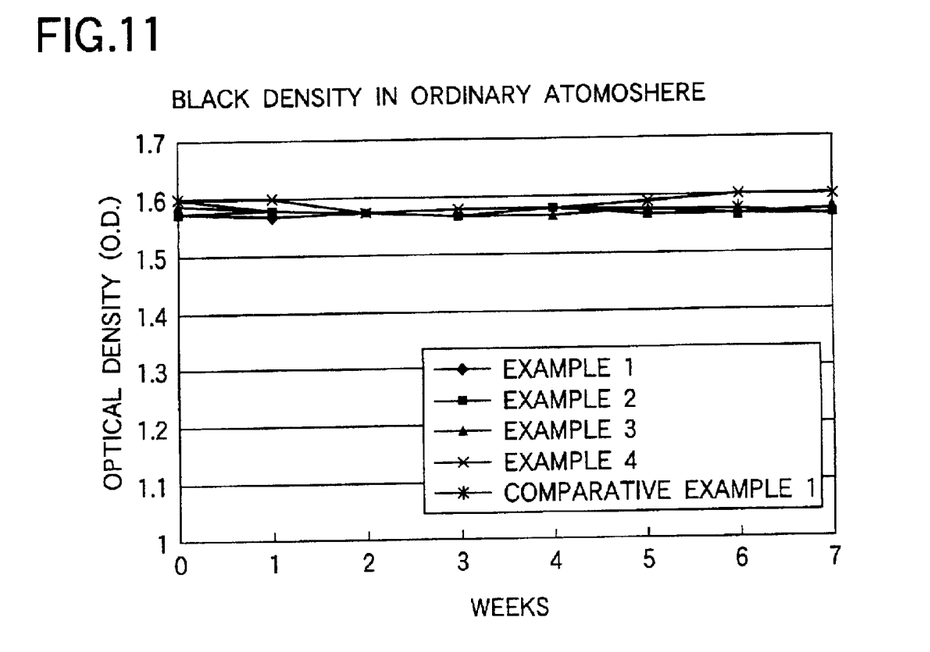
FIG. 11 is a graph showing the relationship between the optical density of black images in display devices left in an ordinary atmosphere and the time for which the display devices are left in the atmosphere.
Figure 12:
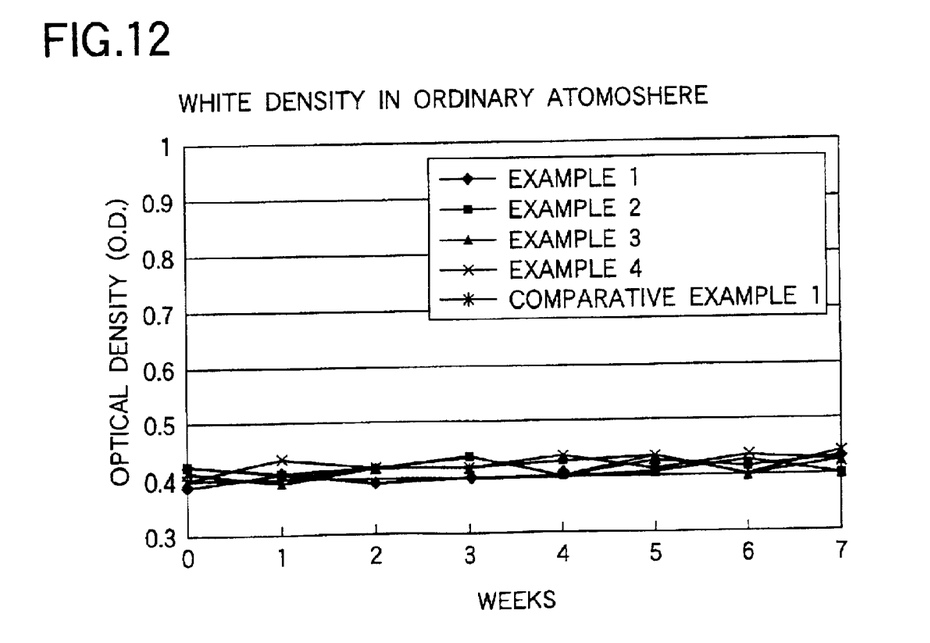
FIG. 12 is a graph showing the relationship between the optical density of white images in display devices left in an ordinary atmosphere and the time for which the display devices are left in the atmosphere.

From FIG. 11 and FIG. 12, it is understood that the display devices of Examples 1 to 4 and Comparative Example 1 are all stable in the ordinary atmosphere.

Figure 13:
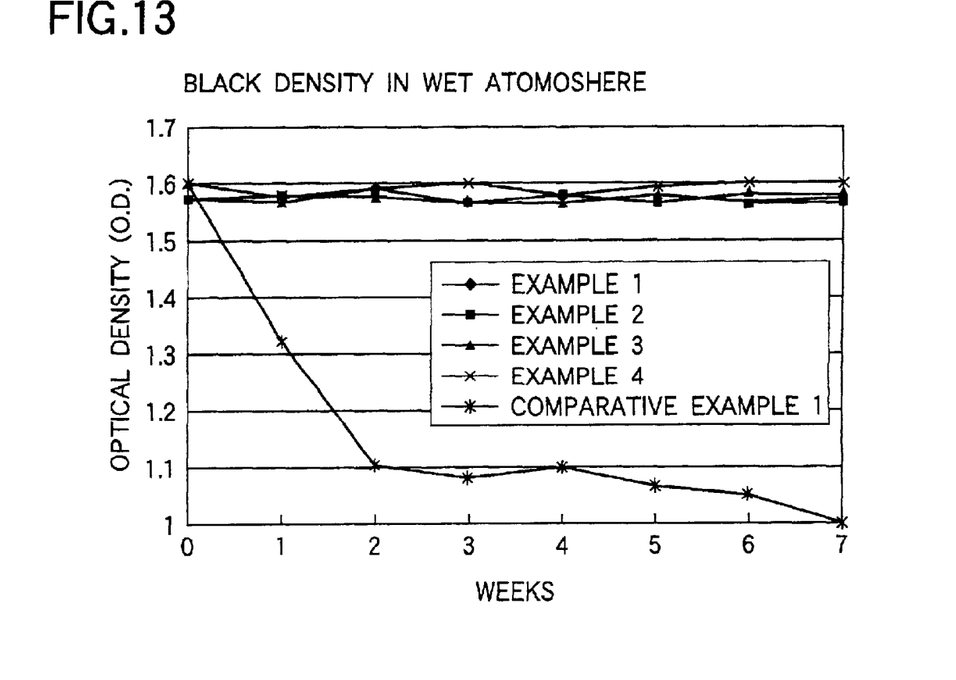
FIG. 13 is a graph showing the relationship between the optical density of black images in display devices left in a wet atmosphere and the time for which the display devices are left in the atmosphere.
Figure 14:
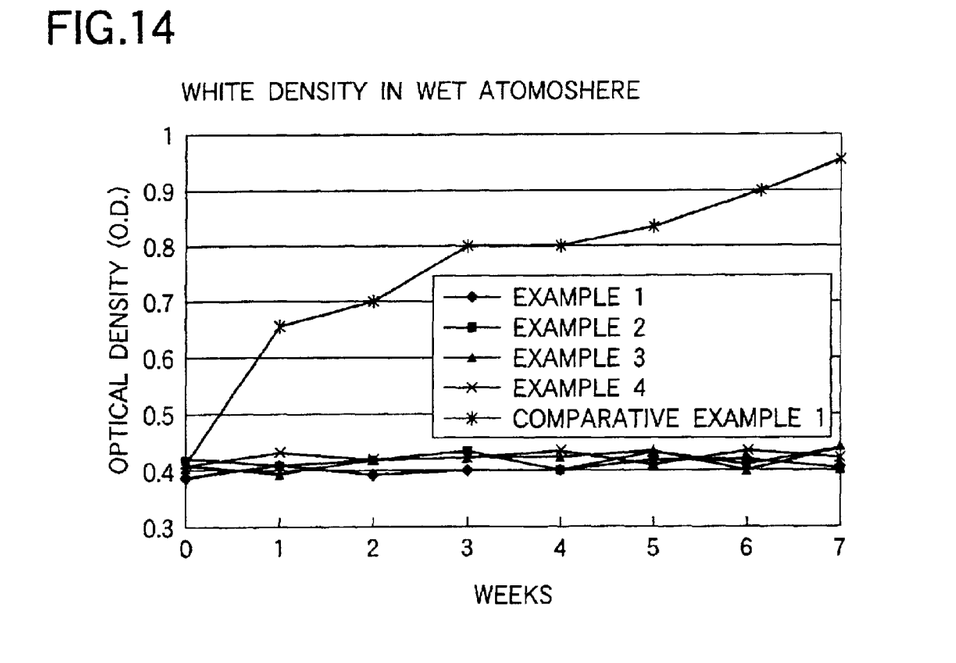
FIG. 14 is a graph showing the relationship between the optical density of white images in display devices left in a wet atmosphere and the time for which the display devices are left in the atmosphere.

From FIG. 13 and FIG. 14, it is understood that the display devices of Examples 1 to 4 are all stable in the wet atmosphere, though their performance fluctuates in some degree. On the other hand, however, the display device of Comparative Example 1 is much influenced by the humidity. After one week, the optical density of the black image shown therein significantly decreases, and that of the white image therein increases.

Example 5

A display device is fabricated in the same manner as in Example 1. In this, however, the dry resist film used is Nippon Synthetic Chemical Industry's ALPHO NEF150 (photosensitive layer: 50 $\mu$m). This is evaluated, and its result is the same as in Example 1.

In the display device of the invention, the inner space formed by the pair of substrates and the spacer is hermetically sealed up, and the humidity inside the substrates can be kept all the time constant, not depending on the ambient humidity. Therefore, the display device ensures constant image formation in any condition.

While the invention has been described in detail and with reference to specific embodiments thereof, it will be apparent to one skilled in the art that various changes and modifications can be made therein without departing from the spirit and scope thereof.

The entire disclosure of Japanese Patent Application No. 2000-268518 filed on Sep. 5, 2000 including specification, claims, drawings and abstract is incorporated herein by reference in its entirety.

What is claimed is:

1. A display device comprising:
   a pair of substrates which face each other and at least one of which transmits light;
   a spacer sandwiched between the pair of substrates; and
   two types of particles of different colors and different electric characteristics all sealed in an inner space formed by the pair of substrates and the spacer,
   wherein the inner space is hermetically sealed up.

2. The display device as claimed in claim 1, wherein the spacer is formed on one of the pair of substrates, and is fixed to the other substrate with a resin.

3. The display device as claimed in claim 1, wherein the space formed by the outer surface of the spacer and the pair of substrates is filled with a resin.

4. The display device as claimed in claim 1, wherein an elastic member is forcedly inserted into the space formed by the outer surface of the spacer and the pair of substrates.

5. The display device as claimed in claim 1, wherein the spacer is formed on one of the pair of substrates, and an elastic member is put between one end of the spacer adjacent to the other substrate and the other substrate.

6. The display device as claimed in claim 1, Wherein one of the two types of particles is electroconductive and the other of the two types of particles is insulating.

7. The display device as claimed in claim 1, wherein the two types of particles have a particle size from 1 $\mu$m to 1000 $\mu$m.

8. The display device as claimed in claim 7, wherein the two types of particles have a particle size from 5 $\mu$m to 50 $\mu$m.

9. The display device as claimed in claim 1, wherein the particles move to one or the other of the pair of substrates when an electric field is applied between the two substrates.

10. The display device as claimed in claim 1, wherein the display device is electrophoretic.

11. The display device according to claim 1, wherein the particles are triboelectrically charged to form an image.

* * * * *